P. B. JOHNSON.
INVERTED LAMP.
APPLICATION FILED AUG. 13, 1908.
933,734.
Patented Sept. 7, 1909.
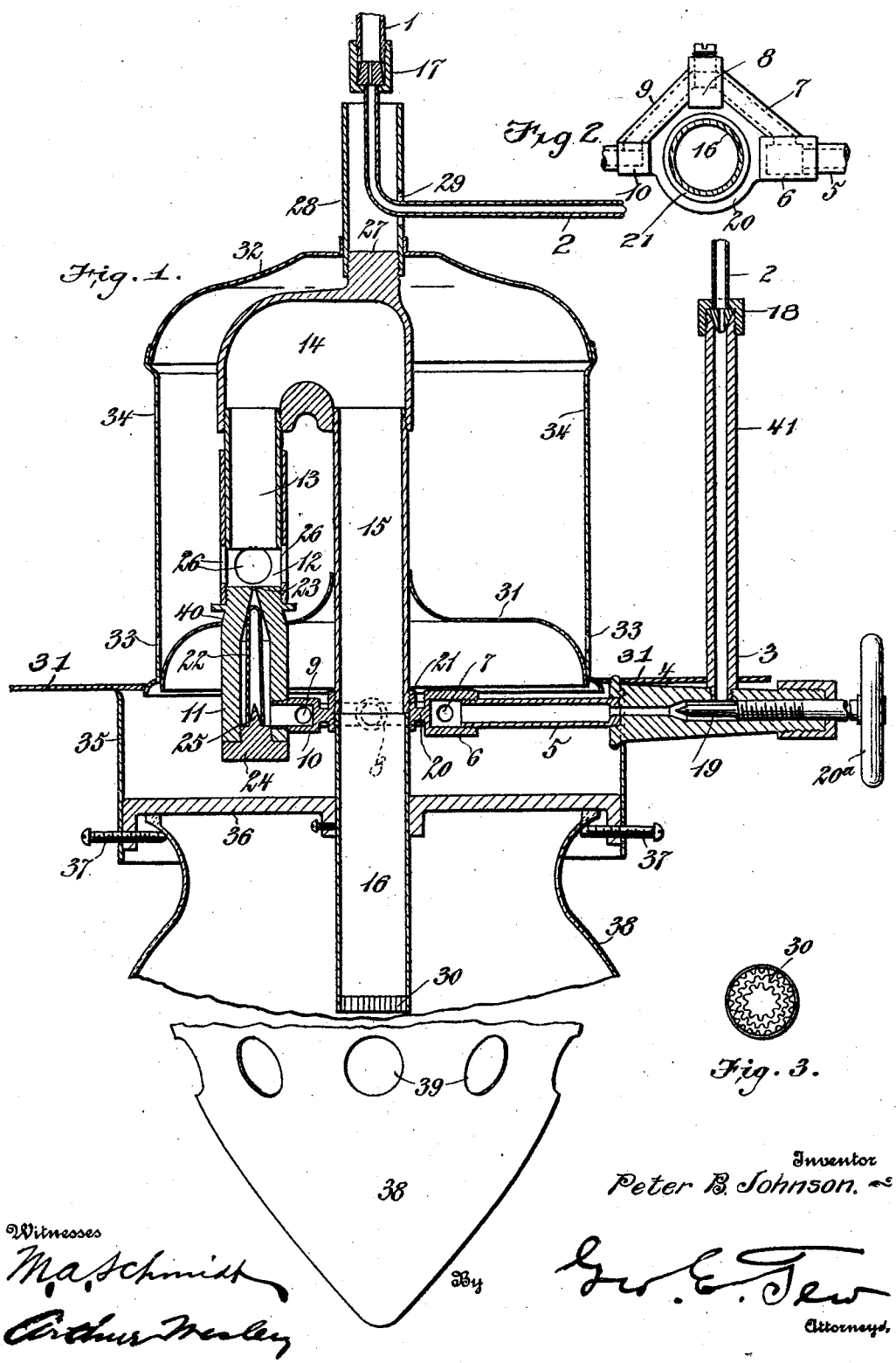

UNITED STATES PATENT OFFICE.

PETER B. JOHNSON, OF CHICAGO, ILLINOIS.

INVERTED LAMP.

933,734.  Specification of Letters Patent.  Patented Sept. 7, 1909.

Application filed August 13, 1908. Serial No. 448,283.

*To all whom it may concern:*

Be it known that I, PETER B. JOHNSON, citizen of the United States, residing at Chicago, in the county of Cook and State of Illinois, have invented certain new and useful Improvements in Inverted Lamps, of which the following is a specification.

This invention is an inverted lamp, adapted and particularly suitable for burning gasolene for illuminating purposes.

The object of the present invention is to produce an improved device of the kind, characterized especially by improved means for heating and vaporizing the gasolene and for supplying the same to the burner which, as stated, is inverted and projects into a globe surrounding the same, the globe being supported by means of a plate mounted upon the burner-tube.

The invention is illustrated in the accompanying drawing in which—

Figure 1 is a vertical section; Fig. 2 is a detail in top view of the vaporizer and Fig. 3 is a detail in plan of the burner-tip.

The lamp is adapted to be suspended in any suitable manner, and the gasolene will be supplied from any adjacent tank and will then flow through a pipe system consisting of the pipes 1, 2, 41, 3, 4, 5, 6, 7, 8, 9, 10, 11, 12, 13, elbow 14, and pipes 15 and 16. The pipes 1 and 2 are connected by a hexagon nut 17 and the pipe 2 and packing tube 41 by a hexagon nut 18, and the pipe 4 forms the casing for the needle-valve 19 which is controlled by its handle 20ª and serves to adjust the flow of gasolene and to cut off the same when desired.

The pipes 5, 6, 7, 8, 9, 10 form the vaporizer, and they extend horizontally across the lamp above the burner and around the depending tube which leads to the burner. Said pipes are made in the form of a one piece casting which has a web 20 connecting the pipes to the ring 21 which is also a part of the casting and which serves to couple the pipes 15 and 16 which are screwed therein.

The upright pipe 11 leads from the pipe 10 and discharges through a very small hole 23 at the top into the mixing chamber formed by the pipes 13, 14, 15 and 16, which may be made in one piece instead of several, if desired. Said pipe 11 is tapered at the top, as indicated at 40, and contains a screen 22 which when inserted in place bears against the inclined side of the pipe adjacent to the discharge orifice, and serves to prevent foreign matter from entering and clogging the orifice. The hole 23 has a diameter of only about 6/1000 of an inch, and it is highly essential that some means be provided for preventing clogging thereof. At its lower end the pipe or chamber 11 has a plug 24 which may be removed for cleaning purposes, and this plug has a point 25 which holds the screen in place, the screen being fastened to the plug, and when the plug is inserted the upper end of the screen fits closely to the wall of the pipe 40 and so performs the function referred to. When the plug is removed the screen also comes out, and can then be readily cleaned.

The pipe 12, above the orifice 23, has several holes 26 to allow the entrance of air. The elbow pipe 14, at the top, is preferably a casting, and has a threaded lug 27 at the top on which the pipe 28 is screwed. This pipe has a hole 29 through which the pipe 2 extends and thereby holds said pipe 2 in position. The pipe 28 also supports the fancy or decorated shell 32 which has air holes at 33 and 34.

31 is a plate or canopy which serves to prevent the heat of the light flowing up. Said canopy is located just above the vaporizing pipes and retains the heat around said pipes so that the gasolene will be vaporized therein.

35 indicates the ornamental collar extending around a horizontal gallery or plate 36 which is mounted and supported on the depending tube 16 and has screws 37 to support the glass globe 38. At the lower end of the pipe 16 is a perforated plug 30 at which the vapor burns.

The light is started by means of a torch held under the vaporizer shown in Fig. 2, and the gas generated will flow through the orifice 23 into the mixing chamber, passing finally to the burner-tip at the lower end of the pipe 16. When the flame is once started at 30 it will continue to keep the vaporizer heated in consequence of the hot air and gas which flow up around the vaporizer and are confined thereto by the canopy or bell 31.

The invention provides a lamp of good appearance and which is safe to operate.

The pipe 8 has a removable plug, which can be taken out and connections made at that point to additional burners or to mantles placed around the lamp body shown. This allows an increase in the number of lights when desired.

I claim:

1. An inverted lamp comprising a mixing chamber having a depending burner pipe at one end, a supply pipe and vaporizer connected to the other end and extending about and fixed to said burner pipe, and a burner at the lower end of the burner pipe.

2. An inverted lamp comprising a pipe provided with an elbow and two depending branches forming a mixing chamber, a burner pipe connected to one of said branches and having a burner at its lower end, a bell inclosing said elbow and branches, a vaporizing pipe connected to the other branch and extending above the burner, and a supply pipe located outside the bell and connected to the vaporizing pipe.

3. The combination of a pipe having a tapered bore and orifice in one end, a plug in the other end, and a screen supported upon the plug and removable therewith, and extending within the pipe to contact with the walls of said tapered bore, to prevent clogging at the orifice.

4. The combination in an inverted lamp of a depending burner-tube having a burner at its lower end, a vaporizing pipe fastened to and extending around said tube above the burner, and a bell supported on the tube above the vaporizer and serving to confine the heat thereto.

In testimony whereof, I affix my signature in presence of two witnesses.

PETER B. JOHNSON.

Witnesses:
  NELLIE FELTSKOG,
  H. G. BATCHELOR.